(12) United States Patent
Chuang et al.

(10) Patent No.: US 8,253,849 B2
(45) Date of Patent: Aug. 28, 2012

(54) LIGHTING CONTROL MODULE, VIDEO CAMERA COMPRISING THE SAME AND CONTROL METHOD OF THE SAME

(75) Inventors: Jen-Hui Chuang, Hsinchu (TW); Kuo-Hua Lo, Kaohsiung (TW); Pang-Chan Hung, Sanchong (TW)

(73) Assignee: National Chiao Tung University, Hsin-Chu (TW)

( * ) Notice: Subject to any disclaimer, the term of this patent is extended or adjusted under 35 U.S.C. 154(b) by 204 days.

(21) Appl. No.: 12/786,179

(22) Filed: May 24, 2010

(65) Prior Publication Data
US 2011/0102664 A1   May 5, 2011

(30) Foreign Application Priority Data
Oct. 30, 2009   (TW) ............................... 98136917 A (51) Int. Cl.
*H04N 5/225* (2006.01)
*H04N 5/222* (2006.01)
(52) U.S. Cl. .................. 348/361; 348/371; 348/E5.119
(58) Field of Classification Search .................. 348/361, 348/366, 371, E5.038
See application file for complete search history.

(56) References Cited

U.S. PATENT DOCUMENTS

| | | | |
|---|---|---|---|
| 6,707,485 B1* | 3/2004 | Higuchi et al. | 348/69 |
| 7,256,833 B2* | 8/2007 | Shaw et al. | 348/370 |
| 2003/0107669 A1* | 6/2003 | Ito et al. | 348/370 |
| 2004/0135923 A1* | 7/2004 | Kato | 348/371 |
| 2005/0140822 A1* | 6/2005 | Ichikawa | 348/370 |
| 2005/0199815 A1* | 9/2005 | Murakumo et al. | 250/354.1 |
| 2006/0250519 A1* | 11/2006 | Kawakami | 348/371 |

* cited by examiner

*Primary Examiner* — Hung Lam
(74) *Attorney, Agent, or Firm* — Birch, Stewart, Kolasch & Birch, LLP (57) ABSTRACT

The present invention provides a lighting control module, a video camera comprising the same and a control method of the same. The video camera of the invention includes a sensing module, a light-emitting module and a control module. The sensing module receives a reflected light beam from a recording direction of the video camera, and generates an image of a scene in the recording direction. The light-emitting module emits a light toward the recording direction. Additionally, the lighting control module is connected to the light-emitting module for controlling the light-emitting module to periodically emit the light from a first brightness to a second brightness.

13 Claims, 9 Drawing Sheets

LIGHTING CONTROL MODULE, VIDEO CAMERA COMPRISING THE SAME AND CONTROL METHOD OF THE SAME

FIELD OF THE INVENTION

The present invention relates to a lighting control module, a video camera comprising the same and a lighting control method, and more particularly, to an infrared surveillance camera and a control method of the same.

BACKGROUND OF THE INVENTION

As the camera related technology (For example, the sensing technology of the sensing device and the image processing technology of processing device, etc.) moves forwards, the camera nowadays can, under all kinds of environments (For example, indoor, within a vehicle, in the night time, or in the rainy day, etc.), perform image acquisition and processing so as to provide the needed image information to the user.

Among many camera applications, video surveillance is one area that seizes attention in recent years, and its application scope as well as importance grows with time too. For example, the surveillance camera installed on the roadside can be provided to the traffic authority to seize the traffic condition at any time and to perform the traffic sign change or to increase the traffic guidance flexibility. The surveillance camera installed at home can let the residents seize the real time situation of their homes, especially when there is a long way travel, or there is elderly people, weak people, woman or children, that is, the residents can go for a long travel with peace of mind. In addition, the installation of the surveillance camera in the alley or the peripheral of a building can let the police or the guard seize the public security condition, especially when there is crime involved, the police can check out the video to watch its content so as to seize the condition at the crime scene and the features of the suspect.

Since crime usually occurs in the night, and the crime scene is usually at the dead space or dark corner in the community which no body pays attention to, hence, the near infrared camera that has night photography function has become necessity for video surveillance. The wavelength of the near infrared is about in the range 700 to 4,000 nm. Through the sensing of image in the near infrared wavelength range, the near infrared camera can generate clearer image in the night or in the dark place.

However, the image captured with a near infrared camera usually has the issues of insufficient contrast, insufficiently sharp features of foreground object, hence, the expected subject image is usually not clear, and its features are thus difficult to be recognized.

SUMMARY OF THE INVENTION

One objective of the present invention is to provide one lighting control module to solve the above prior art issues.

Based on one embodiment, the lighting control module is connected to at least a light emitting module and is used to control the light emitting module to emit one optical beam toward the recording direction of the camera, and the features are: the lighting control module will control the light emitted from the light emitting module to change periodically from a first brightness to a second brightness. In other words, the lighting control module of the present invention can be simultaneously connected to multiple light emitting modules and control respectively the optical beams from those light emitting module to change periodically from the first brightness to the second brightness.

What needs to be noticed is, the above mentioned light emitting module can be integrated into camera or can be independent from the camera.

Another objective of the present invention is to provide a camera to solve the prior art issue.

Based on one embodiment, the camera contains one sensing module, one light emitting module and the above mentioned lighting control module. The sensing module can receive a reflected light from one recording direction of the camera and generate an image on the recording direction. The light emitting module emits a light in the recording direction. In addition, the lighting control module is connected to the light emitting module so as to control the light emitted from the light emitting module to change periodically from a first brightness to a second brightness.

Yet another objective of the present invention is to provide a lighting control method to solve the prior art issue.

Based on one embodiment, the lighting control method can control at least a light emitting module of a camera to emit a light beam toward a recording direction of the camera, and the features are: the lighting control method control the light emitted from the light emitting module to change periodically from a first brightness to a second brightness.

To sum up the above, the lighting control module based on the present invention comprising of a camera of the lighting control module and a lighting control method to control periodically the light emitting module of the camera to emit light from strong to weak intensity or from weak to strong intensity, hence, the camera, within a light emitting period, can acquire clear images of objects of different depths of focus.

The advantages and spirit regarding the present invention can be further understood through the following detailed descriptions and drawings of the present invention.

DETAILED DESCRIPTION OF THE PREFERRED EMBODIMENTS

The present invention provides a lighting control module, comprising of a camera of the lighting control module and a lighting control method. In the followings, the embodiments and real applications of the present invention are going to be explained in detail so as to fully explain the features, spirit and advantages of the present invention.

Figure 1:
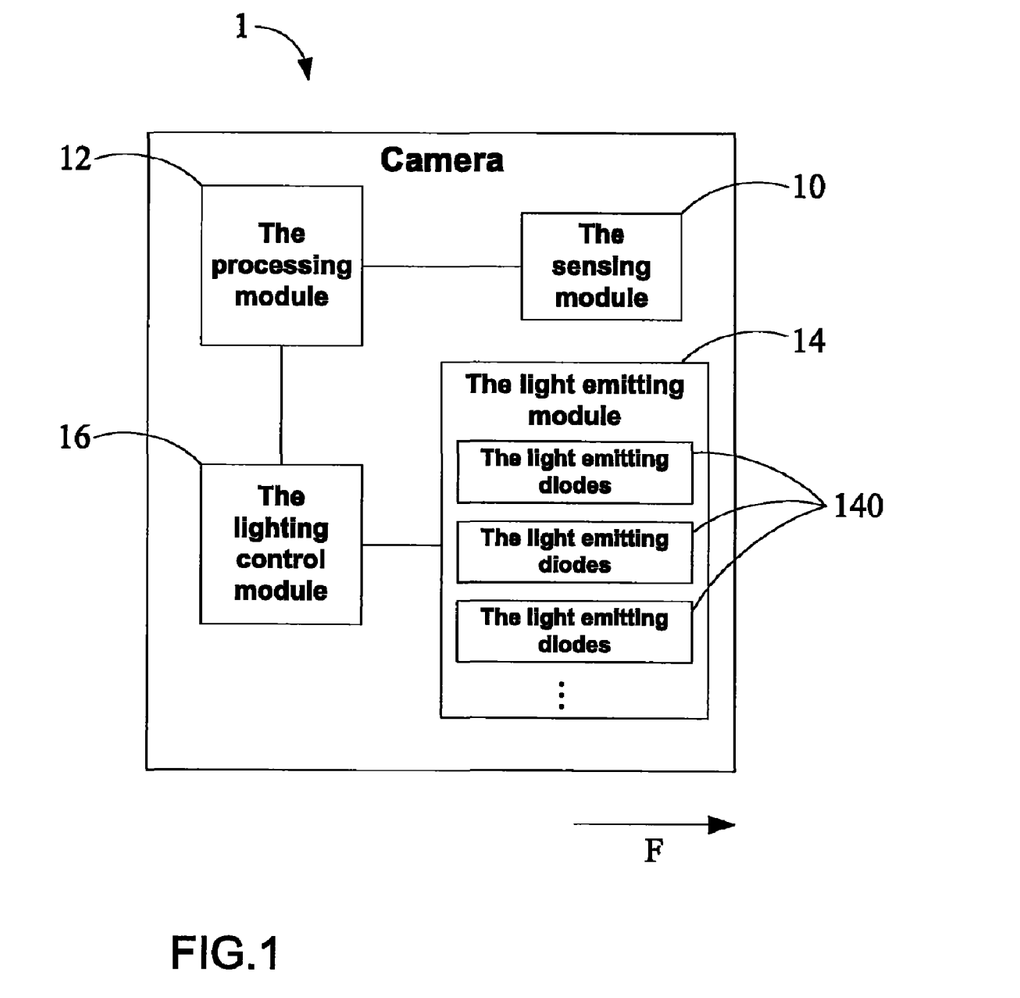
FIG. 1 illustrates the functional block diagram of one embodiment of the camera based on the present invention.

FIG. 1 illustrates the functional block diagram based on one embodiment of the present invention. As shown in the figure, the camera 1 of the present invention comprising of the sensing module 10, the processing module 12, the light emitting module 14 and the lighting control module 16.

The sensing module 10 includes the Charge-Coupled Device (CCD), Complementary Metal-Oxide-Semiconductor (CMOS) or other appropriate sensing device so as to receive a reflected light on the recording direction F aligned by the camera 1 and to generate an image on the recording direction F. In addition, practically, the front side of the sensing module can be installed with lens module to focus the light beam onto the sensing device to form the image. Meanwhile, practically, the reflected light is of near infrared.

The processing module 12, for example, but is not limited to the microprocessor, is connected to the sensing module 10 to process the image generated by the sensing module 10, meanwhile, based on this image, the environmental brightness in the recording direction F is calculated, and the brightness information is then generated based on this information.

The light emitting module 14 can emit light in the above camera direction F. In the present embodiment, the light emitting module 14 is made up of a plurality of the light emitting diodes 140, and those light emitting diodes 140 can be installed by surrounding the above mentioned lens module. Of course, practically, the light emitting module 14 can be made up of other proper optical sources. In addition, in the present embodiment, light emitted by the light emitting module 14 is near infrared.

The lighting control module 16, for example, but not limited to the microprocessor, is connected to the light emitting module 14 to control the light emitted from the light emitting module 14 to change periodically from a first brightness to a second brightness. Practically, the first brightness and the second brightness can be respectively the maximum and minimum brightness that the light emitting module 14 can generate, and vice versa. In other words, the lighting control module 16 of the present invention can control the light emitted brightness of the light emitting module 14, within a light emitting period, to change gradually from maximum to minimum, or gradually from minimum to maximum, and the circulation is repeated continuously.

For example, if the maximum light emitting brightness of the light emitting module 14 is of 100 units, and the minimum light emitting brightness is of 10 units. The lighting control module 16 can control the light emitting module 14, within a light emitting period, to start sending 100 units of light and to weaken gradually down to 10 units of light to complete a light emitting period, then it will start again from 100 units of light for another light emitting period. Or, the lighting control module might control the first light emitting module 14 to send out 10 units of light, and gradually increase the light to 100 units to complete a light emitting period, then it will start again from 100 units of light for another light emitting period.

Moreover, the lighting control module will control the first light emitting module 14 to emit light of 10 units and increase it gradually to 100 units, then decrease it gradually again to 10 units to complete a light emitting period, then another light emitting period is started from light of 100 units. Of course, practically, the light intensity change in each light emitting period can be decided by the designer and is not limited to the embodiment as made in this patent specification.

In addition, the lighting control module 16 can also be connected to the processing module 12 so as to receive environmental brightness information from the processing module 12, meanwhile, based on the brightness information, the scope of the above mentioned first brightness and second brightness is adjusted. What needs to be noticed is, during the actual application, the lighting control module 16 and the processing module 12 can be integrated into a single chip.

Take the above case as an example, when the environmental brightness is insufficient, the scope of the first brightness and second brightness can be in between 50 units and 100 units; meanwhile, when the environmental brightness is sufficient, the scope of first brightness and second brightness can be in between 10 units and 50 units. In other words, when environmental brightness is considered, the light emitting module 14 of the present invention can complete a light emitting period more quickly so as to increase the circulation frequency of the light emitting period.

In the actual application, the lighting control module 16 of the present invention the light emitting brightness of light emitting module 14 is controlled through the control of the light emitting quantity of the light emitting diodes 140 in the light emitting module 14. In other words, the lighting control module 16 will follow light emitting diode quantity to decide the light emitting period so as to control the light, within the light emitting period, to change from the first brightness to the second brightness.

For example, suppose the image acquisition frequency of the camera 1 is 30 fps, the unit length (T) of light emitting period will be larger than or equal to the quantity of light emitting diode (LEDMax) divided by 30 (seconds), which is as shown in the following [equation 1]. Briefly speaking, according to [equation 1], when the quantity of LED is 45, each light emitting period will be 15 seconds; when LED quantity is 24, each light emitting period will be 0.8 seconds.

$$T \geq LED_{max}/30 \text{ (seconds)} \qquad [\text{Equation 1}]$$

Of course, practically, the unit length of light emitting period can be adjusted based on actual need and is not limited to the above embodiments.

Please refer again to FIG. 2, which shows, based on one embodiment of the present invention, how the lighting control module controls the light emitting module of the camera. As shown in the figure, the lighting control module 16 of the present invention can be simultaneously connected to the light emitting module 14 of a plurality of the camera 1.

Figure 2:
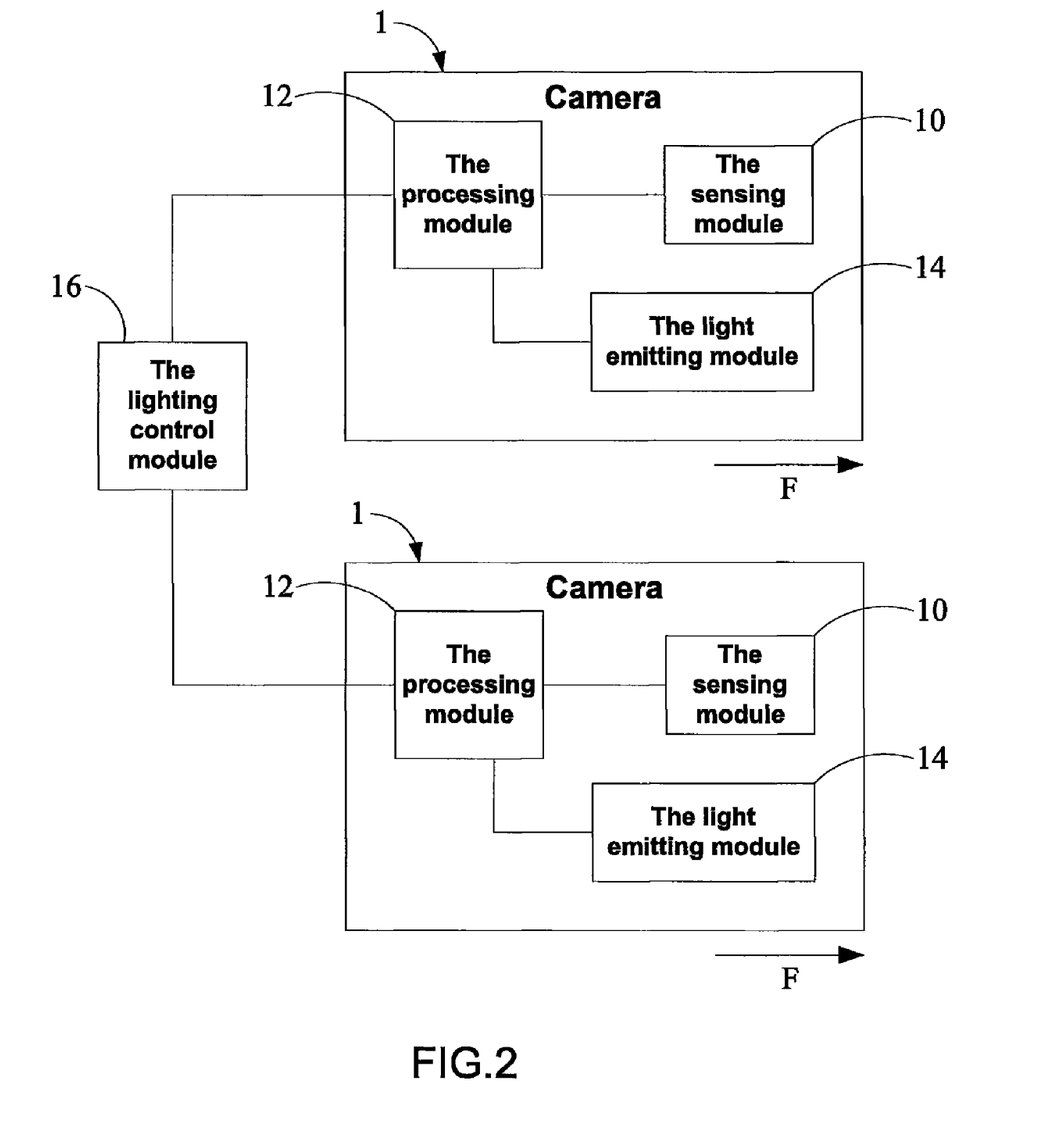
FIG. 2 illustrates, based on one embodiment of the present invention, how the lighting control module controls the light emitting module of the camera.

In the present embodiment, the lighting control module 16, through the processing module 12 of the camera 1, is connected to the light emitting module 14. However, practically, the lighting control module 16 can also be connected directly to the light emitting module 14. In addition, in the present embodiment, the connection relationship and function of modules included in the camera 1 is the same as the embodiment in the prior art and will not be mentioned again here.

In addition, practically, the lighting control module 16 can be installed within the data processing equipment, for example, the computer, then through the data processing equipment, it is connected to several cameras 1. When those cameras 1 are installed at the same space, clear image of object within the space can then be provided.

What needs to be noticed is, during the actual application, the light emitting module 14 of the present invention can be independent from the camera 1 to be placed at appropriate lighting position to provide appropriate optical source to the camera 1.

Figure 3:
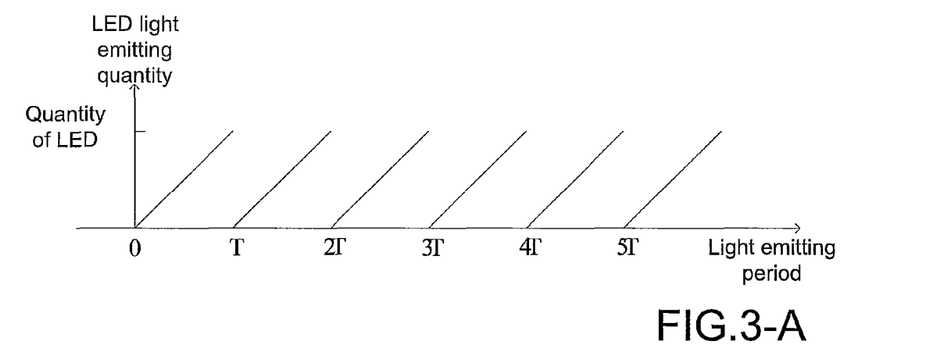
FIGS. 3A to 3C illustrate respectively the temporal relationship between the light emitting period and LED light emitting quantity of the present invention.

Please also refer to FIGS. 3A to 3C, which illustrate respectively, based on the present invention, the temporal relationship between the light emitting period and LED light emitting quantity. Among them, FIG. 3A illustrates the above mentioned gradually increasing period; FIG. 3B illustrates the gradually decreasing period; FIG. 3C illustrates the zig-zag (wavy) period.

Figure 4:
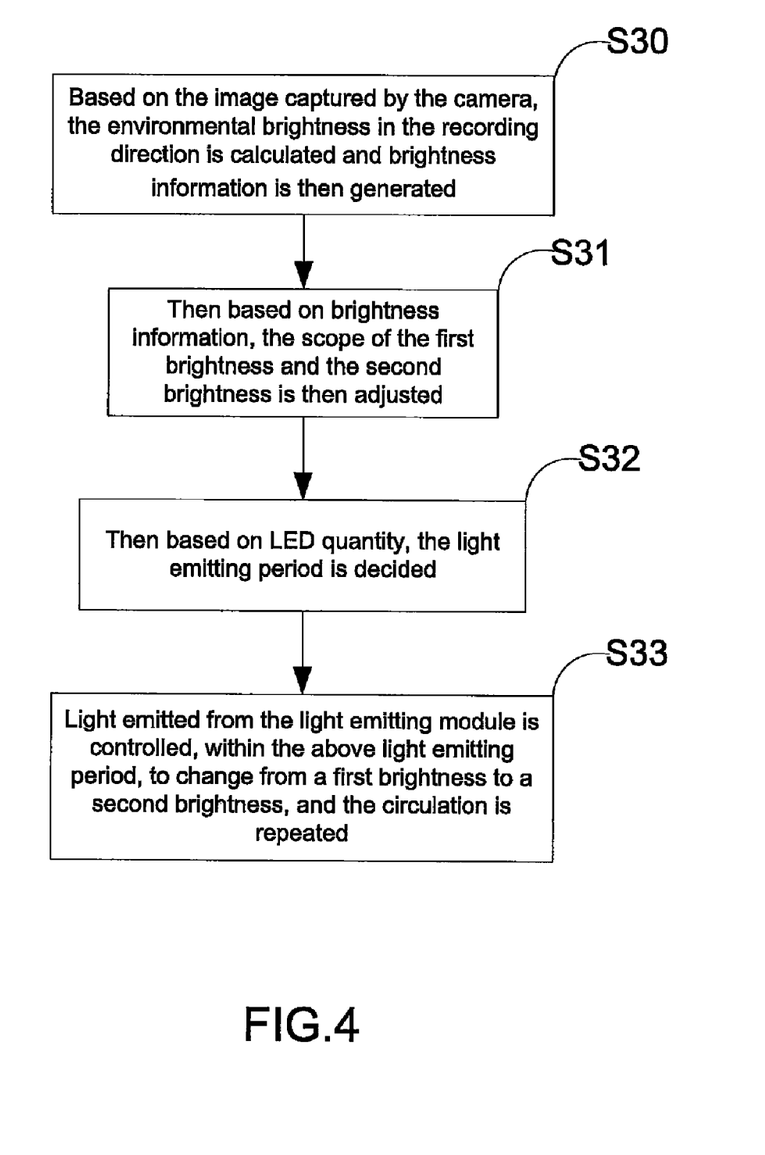
FIG. 4 illustrates, based on one embodiment of the present invention, the block diagram for the control method of the camera.

Please refer FIG. 4, which illustrates, based on one embodiment of the present invention, the block diagram of the camera control method. The camera, as mentioned above, includes a light emitting module to emit light towards the recording direction, and the light emitting module includes a plurality of LEDs that can emit near infrared. As shown in FIG. 4, the method of the present invention includes the following steps:

First, step S30 is performed. Then based on the image captured by the camera, the environmental brightness in the recording direction is calculated and brightness information is then generated.

Next, step S31 is performed. Then based on brightness information, the scope of the first brightness and the second brightness is then adjusted.

Next, step S32 is carried out. Then based on LED quantity, the light emitting period is decided. Practically, the unit length of the light emitting period can be decided from the above [equation 1], or decided based on other appropriate way by the designer.

Finally, step S33 is carried out. That is, light emitted from the light emitting module is controlled, within the above light emitting period, to change from a first brightness to a second brightness, and the circulation is repeated. That is, the camera, within one light emitting period, can acquire the clear images of objects at different depths of focus.

Practically, the above mentioned steps S30 and S31 do not necessarily be implemented. The method of the present invention can set up default value for the range of the first brightness and the second brightness, for example, the first brightness is the maximum brightness the light emitting module can emit (For example, when all LEDs emit light), and second brightness is the minimum brightness the light emitting module can emit (For example, only one LED emits light), and it is true vice versa.

Furthermore, please also refer to FIGS. 5A to 5G and the following table 1. FIGS. 5A to 5G illustrate the brightness changing result based on the camera of the present invention, with a distance between foreground object and camera of about 1.5 meters; table 1 lists the image analysis result from FIG. 5A to FIG. 5G.

Figure 5:
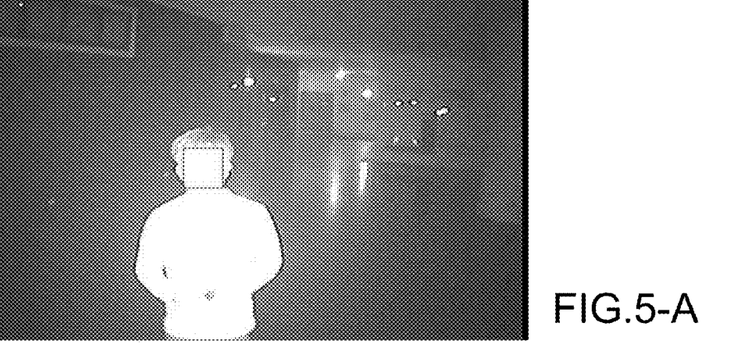
FIGS. 5A to 5G illustrates the recording results based on the brightness scanning of the camera of the present invention with a distance between foreground object to the camera of about 1.5 meters.

Among them, FIG. 5A is the image captured when all the LEDs of the camera light up; FIG. 5B is the image captured when four LEDs are closed; FIG. 5C is the image captured when eight LEDs are closed; FIG. 5D is the image captured when 12 LEDs are closed; FIG. 5E is the image captured when 16 LEDs are closed; FIG. 5F is the image captured when 20 LEDs are closed; and FIG. 5G is the image captured when 24 LEDs are closed.

The statistical values in table 1 can be divided into three types, namely: The mean of the grey value of each pixel within the rectangular frame from FIG. 5A to 5G, standard deviation and the mean of Sobel gradient values.

TABLE 1

|  | FIG. 5A | FIG. 5B | FIG. 5C | FIG. 5D | FIG. 5E | FIG. 5F | FIG. 5G |
| --- | --- | --- | --- | --- | --- | --- | --- |
| Mean | 253.47 | 247.88 | 240.39 | 232.28 | 232.04 | 220.78 | 205.57 |
| Standard deviation | 3.93 | 43.48 | 109.72 | 150.84 | 119.86 | 84.79 | 57.57 |
| Mean of Sobel gradient values | 6 | 29 | 69 | 113 | 90 | 78 | 52 |

From these three data, we see that FIG. 5D has higher standard deviation, which means that it has larger global change; but the mean of Sobel gradient values is larger, which means that it has larger local change. To sum up these two factors, the contrast of human face of FIG. 5D is higher than that of other figure. As compared to the image captured when the brightness is not adjusted (as in FIG. 5A), FIG. 5D has higher human face contrast and clarity.

Please refer together to FIG. 6A to 6F and the following table 2. FIGS. 6A to 6F illustrate the brightness changing results using the camera of the present invention with distance between the foreground object to camera about 3 meters; table 2 lists the image analysis result from FIG. 6A to 6F.

Figure 6:
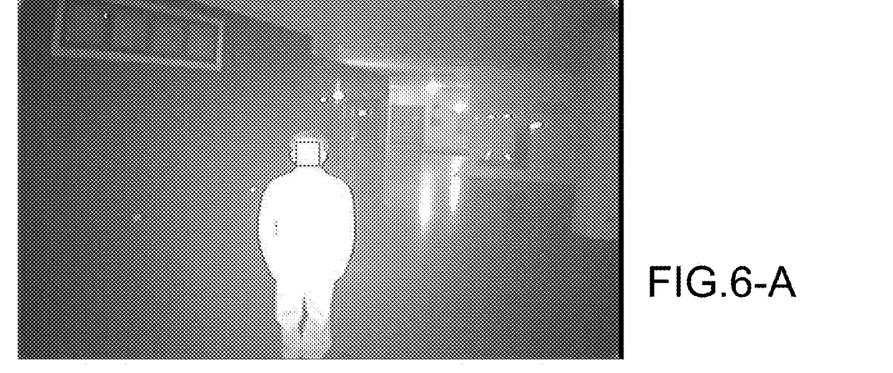
FIGS. 6A to 6F illustrates the recording results based on the brightness scanning of the camera of the present invention with a distance between foreground object to the camera of about 3 meters.

Among them, FIG. 6A is the image captured when all the LEDs of the camera light up; FIG. 6B is the image captured when 4 LEDs are closed; FIG. 6C is the image captured when 8 LEDs are closed; FIG. 6D is the image captured when 12 LEDs are closed; FIG. 6E is the image captured when 16 LEDs are closed; FIG. 6F is the image captured when 20 LEDs are closed.

TABLE 2

|  | FIG. 6A | FIG. 6B | FIG. 6C | FIG. 6D | FIG. 6E | FIG. 6F |
| --- | --- | --- | --- | --- | --- | --- |
| Mean | 253.82 | 245.42 | 234.60 | 218.98 | 205.04 | 202.64 |
| Standard deviation | 0.98 | 76.00 | 138.34 | 96.94 | 69.60 | 40.38 |
| Mean of Sobel gradient values | 5 | 44 | 107 | 125 | 71 | 57 |

From these three data, we observe that FIG. 6C has higher standard deviation, which means that it has larger global change; however, FIG. 6D has larger mean of Sobel gradient value, which means that it has larger local change. Therefore, human face contrast of FIG. 6C and FIG. 6D is higher than that of other figures. As compared to the image captured (as in FIG. 6A) when the brightness is not adjusted, FIG. 6C and FIG. 6D all show higher human face contrast and clarity.

From the above embodiment, we can observe that when the object is about 1.5 meters to the camera, if image of higher contrast of human face (high standard deviation) is to be obtained, 12 to 16 light emitting diodes need to be turned off; when the object has a distance of 3 meters to the camera and if image of higher human face contrast is to be obtained, 8 to 12 light emitting diodes need to be turned off. However, if background image of higher contrast is to be obtained, turnoff of zero light emitting diode is a better choice. Therefore, the use of brightness changing can let you obtain respective clear image of object of different distance.

To sum up the above, the camera and the control method based on the present invention can periodically control the light emitting module of camera to emit light from high to low brightness or from low to high brightness so that the camera, within a light emitting period, can acquire clear images of objects of different depths of focus, hence, the recognition rate at the back end processing for night security surveillance can then be enhanced, and the prior art issue can accordingly be solved.

Although the present invention is disclosed through a better embodiment as above, yet it is not used to limit the present invention, anyone that is familiar with this art, without deviating the spirit and scope of the present invention, can make any kinds of change, revision and finishing; therefore, the protection scope of the present invention should be based on the scope as defined by the following attached "what is claimed".

What is claimed is:

1. A lighting control module, connected to at least a light emitting module, for controlling the light emitting module to emit a light toward a recording direction of a camera, characterized in that the lighting control module controls the light emitted by the light emitting module to change periodically from a first brightness to a second brightness,
    wherein the light emitting module comprises a strength of the light emitted by the light emitting module, so that the light emitted by the light emitting module changes periodically from the first brightness to the second brightness, and
    wherein the light emitting module comprises a plurality of light emitting diodes, and the lighting control module controls the number of the light emitting diodes which emit light, determines a light emitting period according to the number of the light emitting diodes which emit light and controls the light to change from the first brightness to the second brightness within the light emitting period.

2. The lighting control module of claim 1, wherein the camera further comprises:
    a sensing module, for receiving a reflected light from the recording direction and generating an image related to the recording direction; and
    a processing module, connected to the sensing module, for calculating an environmental brightness in the recording direction according to the image and generating a brightness information;
    wherein the lighting control module is connected to the processing module to receive the brightness information and adjust the range of the first brightness and the second brightness according to the brightness information.

3. The lighting control module of claim 2, wherein the reflected light is a near infrared.

4. The lighting control module of claim 1, wherein when the image acquisition frequency of the camera is 30 fps, the unit length of the light emitting period is larger than or equal to the quantity of those light emitting diodes divided by 30 (seconds).

5. The lighting control module of claim 4, wherein the first brightness is the minimum brightness of the light emitted by the light emitting module, and the second brightness is the maximum brightness of the light emitted by the light emitting module.

6. The lighting control module of claim 4, wherein the first brightness is the maximum brightness of the light emitted by the light emitting module, and the second brightness is the minimum brightness of the light emitted by the light emitting module.

7. The lighting control module of claim 1, wherein the light emitting module is integrated within the camera or is independent from the camera.

8. A camera, comprising:
    a sensing module for receiving a reflected light emitted from a recording direction of the camera and generating an image in the recording direction;
    a light emitting module for emitting a light toward the recording direction; and
    a lighting control module, connected to the light emitting module, for controlling the light emitted by the light emitting module to change periodically from a first brightness to a second brightness,
    wherein the lighting control module controls the strength of the light emitted by the light emitting module, so that the light emitted by the light emitting module changes periodically from the first brightness to the second brightness, and
    wherein the light emitting module comprises a plurality of light emitting diodes, and the lighting control module controls the number of the light emitting diodes which emit light, determines a light emitting period according to the number of the light emitting diodes which emit light, and controls the light to change from the first brightness to the second brightness within the light emitting period.

9. The camera of claim 8, further comprising:
    a processing module, connected to the sensing module for, based on the image, calculating an environmental brightness on the recording direction, and generating a brightness information; wherein the lighting control module is connected to the processing module to receive the brightness information and adjust the range of the first brightness and the second brightness according to the brightness information.

10. The camera of claim 8, wherein the reflected light is a near infrared.

11. A camera, comprising:
    a sensing module for receiving a reflected light emitted from a recording direction of the camera and generating an image in the recording direction;
    a light emitting module for emitting a light toward the recording direction; and
    a lighting control module, connected to the light emitting module, for controlling the light emitted by the light emitting module to change periodically from a first brightness to a second brightness,
    wherein when one of the image acquisition frequency of the camera is 30 fps, the unit length of the light emitting period is larger than or equal to the quantity of those light emitting diodes divided by 30 (seconds).

12. The camera of claim 11, wherein the first brightness is the minimum brightness of the light emitted by the light emitting module, and the second brightness is the maximum brightness of the light emitted by the light emitting module.

13. The camera of claim 11, wherein the first brightness is the maximum brightness of the light emitted by the light emitting module, and the second brightness is the minimum brightness of the light emitted by the light emitting module.

* * * * *